(12) United States Patent  
Case et al.

(10) Patent No.: US 7,378,660 B2
(45) Date of Patent: May 27, 2008

(54) COMPUTER PROGRAM, METHOD, AND SYSTEM FOR HYBRID CT ATTENUATION CORRECTION

(75) Inventors: James A. Case, Kansas City, MO (US); Bai-Ling Hsu, Kansas City, MO (US); S. James Cullom, Leawood, KS (US); Timothy M. Bateman, Leawood, KS (US); Paul Helmuth, Kansas City, MO (US)

(73) Assignee: Cardiovascular Imaging Technologies L.L.C., Kansas City, MO (US)

( * ) Notice: Subject to any disclaimer, the term of this patent is extended or adjusted under 35 U.S.C. 154(b) by 78 days.

(21) Appl. No.: 11/535,228

(22) Filed: Sep. 26, 2006

(65) Prior Publication Data

US 2007/0075248 A1   Apr. 5, 2007

Related U.S. Application Data

(60) Provisional application No. 60/722,562, filed on Sep. 30, 2005.

(51) Int. Cl.
*G01T 1/161* (2006.01)
*G06K 9/00* (2006.01)
(52) U.S. Cl. ............ 250/363.01; 378/4; 250/363.02; 250/363.04; 382/131

(58) Field of Classification Search ........... 250/363.01, 250/363.02, 363.03, 363.04; 382/131; 378/4
See application file for complete search history.

(56) References Cited

OTHER PUBLICATIONS

J. Bowsher et al., Bayesian Reconstruction and Use of Anatomical A Priori Information for Emission Tomography, Oct. 1996, IEEE Transactions on Medical Imaging, vol. 15, No. 5, pp. 673-686.*
P. Green, Bayesian Reconstructions From Emission Tomography Data Using a Modified EM Algorithm, Mar. 1990, IEEE Transactions on Medication Imaging, vol. 9, No. 1, pp. 84-93.*
H. Malcolm Hudson and Richard S. Larkin, Accelerated Image Reconstruction Using Ordered Subsets of Projection Data, Dec. 1994, IEEE Transactions on Medical Imaging, vol. 13, No. 4, pp. 601-609.*

* cited by examiner

*Primary Examiner*—David P. Porta
*Assistant Examiner*—Mark R Gaworecki
(74) *Attorney, Agent, or Firm*—Hovey Williams LLP (57) ABSTRACT

Embodiments of the present invention provide a computer program, method, and system to facilitate hybrid CT attenuation correction. In one embodiment, the method generally includes acquiring data from a scanner, utilizing an ordered subset expectation maximization-bayesian algorithm to reconstruct the acquired data, and forward projecting the reconstructed data. Such a configuration minimizes the computing resources required for reconstruction and improves attenuation correction accuracy.

26 Claims, 4 Drawing Sheets

COMPUTER PROGRAM, METHOD, AND SYSTEM FOR HYBRID CT ATTENUATION CORRECTION

RELATED APPLICATIONS

The present non-provisional application claims the benefit of U.S. Provisional Application No. 60/722,562, filed Sep. 30, 2005. The identified provisional application is incorporated herein by specific reference.

BACKGROUND OF THE INVENTION

1. Field of the Invention

Embodiments of the present invention relate to computer programs, methods, and systems for hybrid CT attenuation correction. More particularly, various embodiments of the invention relate to a computer program, method, and system for attenuation correction that utilize an ordered subset expectation maximization-bayesian algorithm to facilitate hybrid CT attenuation correction.

2. Description of the Related Art

Radionuclide myocardial perfusion imaging (MPI) is a popular method to assess patients with known or suspected coronary artery disease (CAD). Thallium-201 or Technetium-99m are generally utilized within single photon emission computed tomography (SPECT) to perform MPI. However, technological advances have rendered the use of myocardial perfusion positron emission tomography (PET) with NH3-Ammonia or Rubidium-82 more desirable in various situations than SPECT. Specifically, PET generally provides higher spatial resolution, greater counting efficiencies, and more robust scatter and attenuation correction than that available with SPECT.

PET methods require attenuation correction for the effects of patient specific photon attenuation. Patient specific photon attenuation is the result of a radiopharmaceutical that is injected into a patient to facilitate MPI. PET attenuation methods include utilizing transmission data acquired from a scanner, such as PET source (dedicated PET) or an X-ray source (PET/CT), to correct emission data for the effects of patient specific attenuation.

Although methods are known to facilitate PET attenuation correction, these known methods often provide poor or insufficient transmission counts for reconstruction, allow misregistration and resolution mismatch between transmission and emission data, and fail to correct for the effects of metallic implant artifacts or patient respiratory motion.

SUMMARY OF THE INVENTION

Embodiments of the present invention solve the above-described problems and provide a distinct advance in the art of hybrid CT attenuation correction. More particularly, various embodiments of the invention provide a computer program, method, and system for hybrid CT attenuation correction that utilize an ordered subset expectation maximization-bayesian algorithm to facilitate hybrid CT attenuation correction.

In one embodiment, the present invention provides a method of hybrid CT attenuation correction. The method generally includes acquiring data from a scanner, utilizing an ordered subset expectation maximization-bayesian algorithm to reconstruct the acquired data, and forward projecting the reconstructed data.

In another embodiment, the method generally includes acquiring data corresponding to PET emission and CT transmission images generated by a PET/CT scanner, applying a blurring algorithm to at least a portion of the acquired data to correct for diaphragm motion, segmenting at least a portion of the acquired data, replacing at least one attenuation coefficient within the segmented data to at least partially remove a transmission artifact, forward projecting the segmented data to match the resolution of the PET emission and the forward projected data, utilizing an ordered subset expectation maximization-bayesian algorithm to reconstruct the forward projected data, and forward projecting the reconstructed data.

In another embodiment, the present invention provides a computer program for performing hybrid CT attenuation correction. The computer program comprises a plurality of code segments operable to acquire data from a scanner, utilize an ordered subset expectation maximization-bayesian algorithm to reconstruct the acquired data, and forward project the reconstructed data.

In another embodiment, the present invention provides a system operable to perform hybrid CT attenuation correction. The system generally includes a computing element coupled with a scanner. The computing element is operable to acquire data from the scanner, utilize an ordered subset expectation maximization-bayesian algorithm to reconstruct the acquired data, and forward project the reconstructed data.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
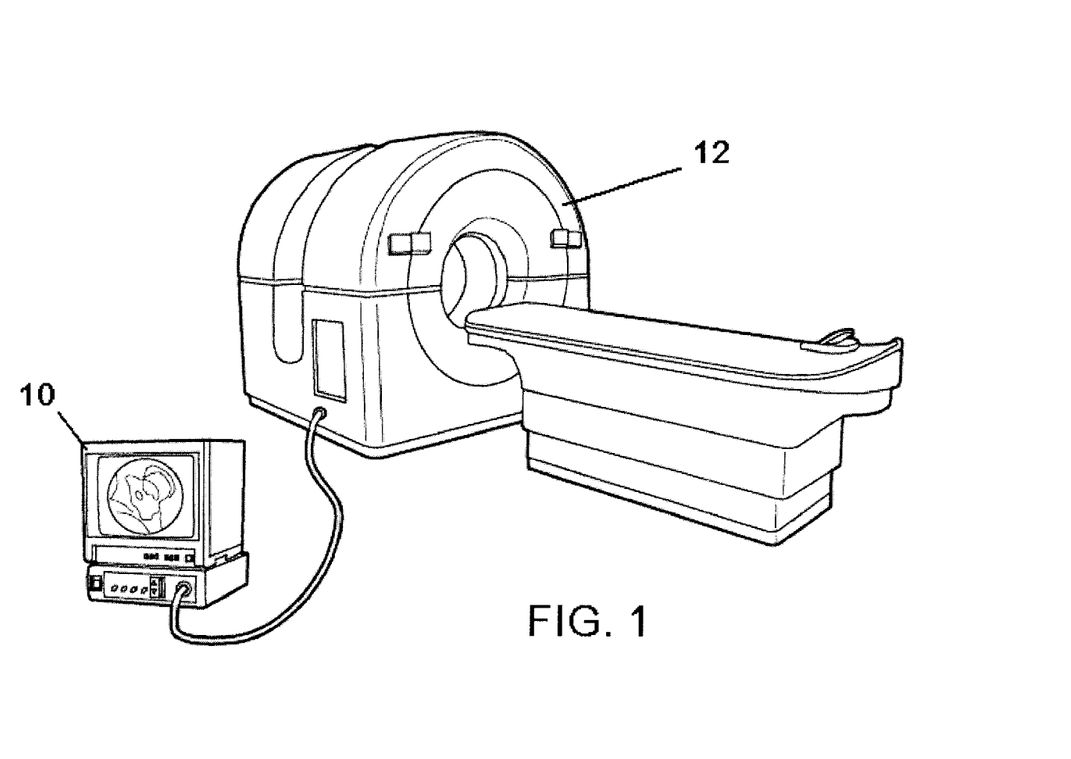
FIG. 1 is a perspective view of a scanner and computing element operable to be utilized by various embodiments of the present invention.

Methods consistent with the present teachings are especially well-suited for implementation by a computing element, such as the computer 10 illustrated in FIG. 1. The computer 10 may be a part of a computer network that includes one or more client computers and one or more server computers interconnected via a communications system such as an intranet or the internet. The present invention will thus be generally described herein as a computer program. It will be appreciated, however, that the principles of the present invention are useful independently of a particular implementation, and that one or more of the steps described herein may be implemented without the assistance of the computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings.

Computer programs consistent with the present teachings can be stored in or on a computer-readable medium residing on or accessible by a host computer for instructing the host computer to implement the method of the present invention as described herein. The computer program preferably comprises an ordered listing of executable instructions for implementing logical functions in the host computer and other computing devices coupled with the host computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media. In the context of this application, a "software object" is a programming unit that groups together a data structure (e.g., instance variables) and the operations (e.g., methods) that can use or affect that data.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
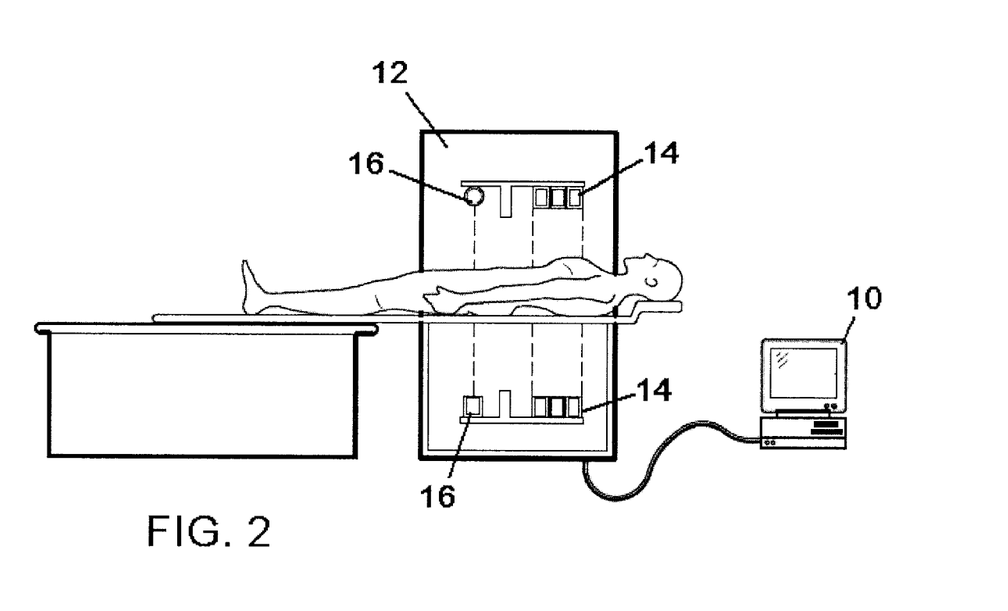
FIG. 2 is a block diagram further illustrating the various elements shown in FIG. 1.

As shown in FIGS. 1-2, the computer 10 is preferably directly or indirectly coupled with a scanner 12 to enable function of the present invention as described below. The scanner 12 includes transmission source and is operable to utilize radiation to generate data corresponding to an image of a patient. Thus, the scanner 12 may include devices that employ positron emission tomography (PET), computed tomography (CT), magnetic resonance imaging (MRI), functional magnetic resonance imaging (fMRI), single photon emission computed tomography (SPECT), similar devices, and combinations thereof.

The scanner 12 is preferably a conventional hybrid CT imaging device such as a PET/CT or SPECT/CT scanner operable to provide emission and transmission data corresponding to PET, CT, and/or SPECT images. For instance, the scanner 12 may be a PET/CT scanner operable to generate data including emission data resulting from the use of PET and transmission data resulting from the use of CT or dedicated PET devices. Such PET, CT, SPECT/CT, and PET/CT devices and associated capabilities are well known in the art.

It should be appreciated that the computer 10 and scanner 12 need not be directly coupled as the scanner 12 may be operable to store data corresponding to generated images on an intermediate device, such as a second computer or internal medium, from which the computer 10 may access the data. Further, it should be appreciated that the computer 10 and the scanner 12 may be integral with each other such that the computer 10 may be operable to provide conventional transmission, diagnosis, computing, and processing functions in addition to the methods disclosed herein.

Figure 3:
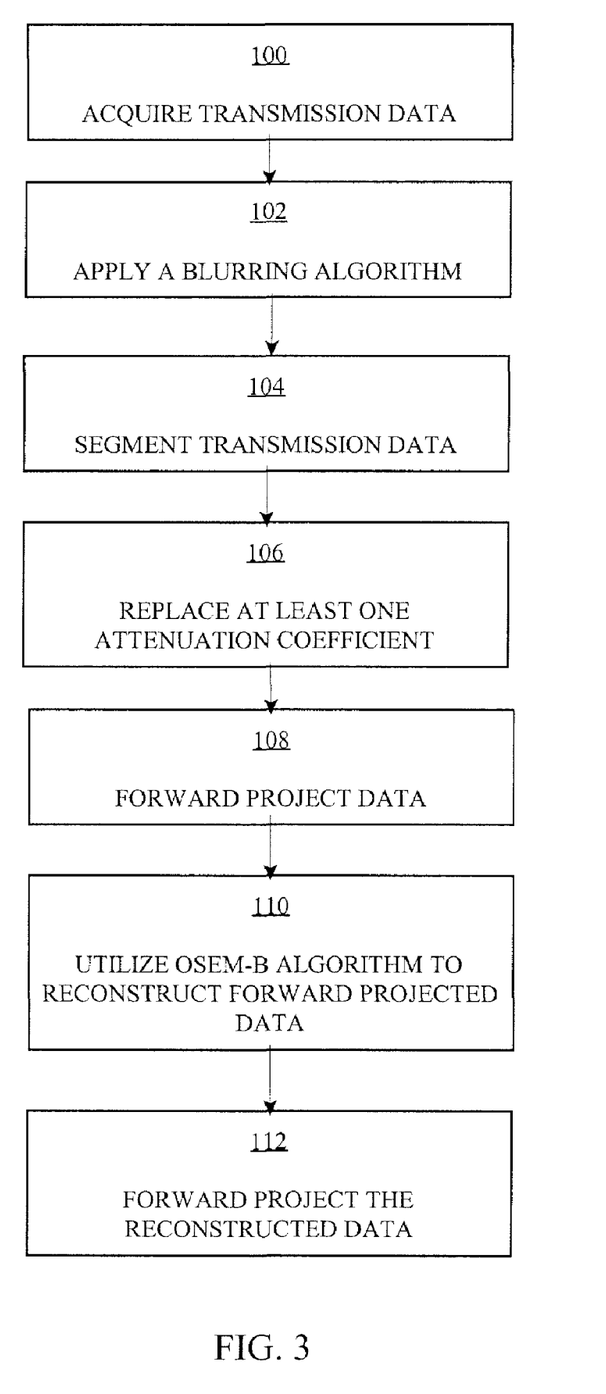
FIG. 3 is a flow chart showing some of the steps operable to be performed by the present invention.

A flowchart of steps that may be utilized by the present invention to correct attenuation is illustrated in FIG. 3. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The steps illustrated in FIG. 3 generally include acquiring transmission data from the scanner 12, referenced at step 100; applying a blur to the acquired transmission data, referenced at step 102; segmenting the transmission data, referenced at step 104; replacing at least one attenuation coefficient within the segmented data, referenced at step 106; forward projecting the segmented data, referenced at step 108; utilizing an ordered subset expectation maximization-bayesian algorithm to reconstruct the forward projected data, referenced at step 110; and forward projecting the reconstructed data, referenced at step 112.

In step 100, data is acquired from the scanner 12. The acquired data corresponds to an image generated by the scanner 12 utilizing radiation. As explained above, the scanner 12 may include conventional PET, CT, MRI, dedicated PET, PET/CT, and SPECT/CT imaging devices, combinations thereof, etc. Preferably, the acquired data corresponds to a hybrid CT imaging device and includes emission data and transmission data that may be utilized to correct the emission data for patient specific attenuation.

The data may be acquired from the scanner 12 utilizing any conventional method, including retrieving the data from a computer-readable medium, retrieving the data through a wired or wireless network connection, retrieving the data directly from sensors that comprise the scanner 12, etc.

In various embodiments, it may be desirable to translate at least a portion of the acquired data to facilitate implementation of one or more of the following steps. For instance, transmission data provided by the scanner 12 may correspond to CT data such that it may be desirable to translate the CT data to attenuation data, such as linear attenuation coefficients, to facilitate attenuation correction as described herein. Specifically, CT transmission data may be translated to linear attenuation coefficients at approximately 511 keV, or any other relevant energy, to facilitate implementation of steps 102-112.

Further, in some embodiments, the acquired transmission data may be initially forward projected utilizing vendor algorithms. As is known in the art, forward projection algorithms exist for hybrid CT devices, such as PET/CT devices, which may be used to conventionally forward project data.

In step 102, a Gaussian or similar blur is applied to the acquired transmission data. Application of the Gaussian blur to the acquired data may be utilized to correct for the effects of diaphragm or any other patient motion during the generation of data by the scanner 12. Gaussian blurs are known in the art of signal processing, and generally comprise an image blurring filter that uses blurring model (Gaussian distribution) for calculating the transformation to apply to each pixel in the image. The equation of Gaussian distribution in a single dimension is given by:

$$G_r = \frac{1}{\sqrt{2\pi}\,\sigma} e^{-\frac{r^2}{2\sigma^2}}$$

wherein r is the blur radius, and s is the standard deviation of the Gaussian distribution. A convolution matrix may be created utilizing pixels where the distribution is non-zero. The matrix is applied to the original image, such as the data acquired in step 100, to set each pixel's value to a weighted average of neighboring pixels. Such functionality provides blurring while generally preserving image boundaries and edges in a desirable manner.

Application of the Gaussian blur to at least a portion of the acquired data corrects for the effects of patient motion, specifically respiratory and diaphragm motion, by mitigating the effects of changes in the transmission data at various stages of the respiratory cycle. For instance, due to a patient breathing during scanning, data generated by the scanner 12 may be distorted. However, application of the Gaussian blur reduces the recorded distortion, renders the acquired data more precise, and increases the accuracy of the attenuation correction.

Although utilization of a Gaussian blur is preferred, the present invention may employ any blurring or signal processing algorithm operable to mitigate the effects of patient motion. For instance, any algorithm that is operable to reduce image noise and distortion may be utilized without departing from the scope of the present invention.

In some embodiments, such as where dedicated PET devices are used to generate the transmission data, it may be generally desirable to perform step 102 subsequent to step 100. In other embodiments, such as where PET/CT devices are used to generate the transmission data, it may be generally desirable to perform step 102 after other steps, such as step 104, discussed below.

In step 104, the acquired data may be segmented. Preferably, portions of the acquired data corresponding to metal objects are segmented for replacement in step 106. For example, the acquired data may correspond to CT transmission data of a patient having one or more metal-implanted artifacts within a region scanned by the scanner 12, as is shown in the example image of FIG. 4.

Such metal-implanted artifacts include ICDs, electrodes, shock coils, pacemakers, stents, surgical devices, or any other implanted object that at least partially comprises metal. Metal-implanted artifacts, without segmentation or replacement, often can create focal tracer and defect fill-in artifacts in cardiac images, as is shown in the example image of FIG. 5, or otherwise inhibit accurate attenuation correction such as by reducing reader confidence and decreasing diagnostic accuracy.

Figure 6:
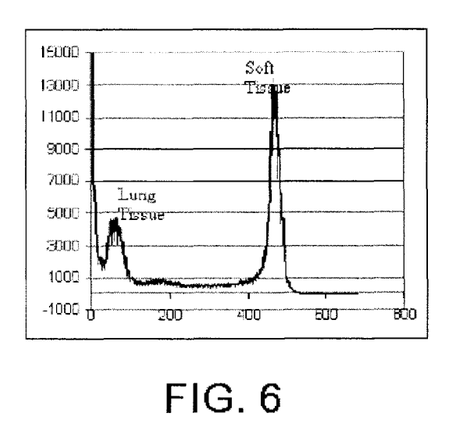
FIG. 6 is an exemplary histogram corresponding to FIG. 4.

Data corresponding to artifacts may be segmented utilizing various methods. Preferably, pixels corresponding to artifacts are identified based upon their linear attenuation coefficients and flagged, removed, or replaced (see step 106) for segmentation. For instance, as shown in FIG. 6, a histogram may be created corresponding to all pixels and associated linear attenuation coefficients within the transmission data to enable the automatic classification of artifacts, lung tissue, and soft tissue. Utilizing the histogram, pixels corresponding to artifacts may be easily identified and segmented. Further, the histogram may be utilized for misregistration detection, as described in step 108.

In step 106, at least one attenuation coefficient is replaced. Replacement of the attenuation coefficient facilitates artifact correction by preventing attenuation data associated with artifacts from being utilized for attenuation correction. Preferably, steps 106 and 108 are performed concurrently or jointly, such that at least one attenuation coefficient may be replaced in combination with the segmentation of data.

The replaced attenuation coefficients are preferably replaced with attenuation coefficients generally corresponding to water, metals, soft tissue, and/or any other attenuation coefficient, with values in the range of 511 keV, or any other energies relevant to SPECT or PET imaging. Such replacement of coefficients corresponding to metal artifacts, or other erroneous data, further facilitates attenuation correction by eliminating streaking or other undesirable effects caused by metal artifacts.

Figure 4:
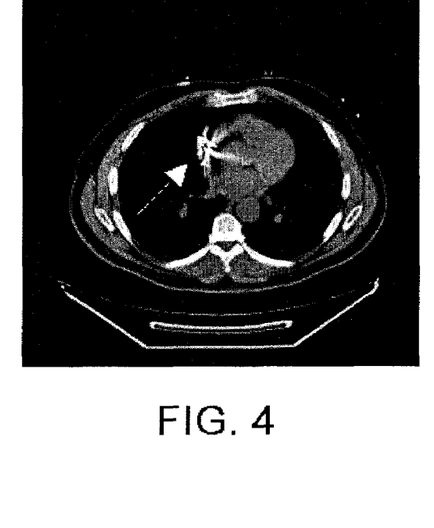
FIG. 4 is an exemplary image corresponding to CT transmission data.
Figure 5:
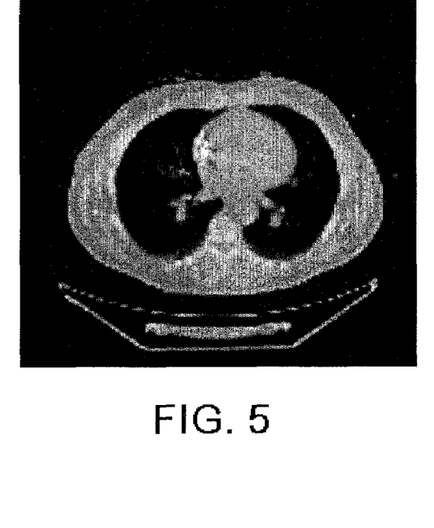
FIG. 5 is an exemplary image corresponding to the image of FIG. 4 without artifact correction.
Figure 7:
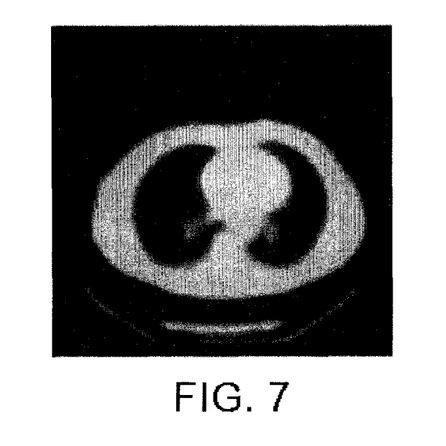
FIG. 7 is an exemplary image corresponding to the image of FIG. 4 with artifact correction.

For example, FIG. 4 illustrates transmission data including an artifact and associated streaking and FIG. 7 illustrates the data of FIG. 4 after blurring (step 102), segmentation (step 104), and replacement of attenuation coefficients (step 106). As can be seen, the streaking and other undesirable image artifacts created by the metal ICD of FIG. 4 are eliminated through segmentation and replacement. In contrast, FIG. 5 illustrates transmission data that is has not been corrected for the effects of metal artifacts in accord with the present invention, resulting in undesirable streaking.

In step 108, the segmented data is forward projected. The forward projection may be accomplished through conventional forward projection methods including ray-tracing.

Further, the resolution of the forward projected data and emission data may be matched in combination with the forward projection. "Resolution", as utilized herein, generally refers to the full-width half maximum pixels within an image that correspond to a fixed object, such as a patient's heart or a point source. In various embodiments, the acquired data may include emission data generated by a first element of the scanner 12, such as a PET element 14, and transmission data generated by a second element of the scanner 12, such as a CT element 16. Due to the hybrid technology employed by the scanner 12 to generate data, the resolution of data corresponding to images generated by the first element is often different than the resolution of data corresponding to images generated by the second element.

For example, the resolution of PET images is generally 5 mm while the resolution of CT images is generally 1 mm. Such differences in resolution prevent accurate PET attenuation correction due to the distortion created by the resolution mismatch. Thus, in various embodiments it is desirable to match the resolution of the acquired emission and transmission data. For instance, acquired transmission CT data may include a 512×512 matrix that is preferably resampled to a 128×128 matrix to facilitate attenuation correction.

To match the resolution of the acquired data, various methods may be employed by the present invention. For example, resolution matching or sampling algorithms may be employed to increase or decrease the resolution of the data by estimating or extrapolating data based upon original and final data resolutions. For example, the transmission data may be resized to match the resolution of the emission data to ensure accurate attenuation correction. However, any conventional or known method of resolution matching may be employed to the match the resolution of the acquired data.

The resolution of the data is preferably matched in combination with the forward projection of step 108 to facilitate comparison of the transmission and emission data. However, the resolution of the acquired data may be matched at any time and need not be limited to matching forward projections of acquired data.

In various embodiments, it is desirable to align the acquired data to prevent misregistration. The acquired data may be aligned independent of the resolution matching and forward projection discussed above, such that the resolution matching and/or data alignment need not always be performed. However, it is generally preferable to both match the resolution and align the acquired data in combination with forward projection.

To align the data, a rigid translation of the emission data and translation data is preferably utilized to align the emission and transmission data at a center of rotation prior to reconstruction. The center of rotation generally refers to the axis about which various elements of the scanner 12 may be positioned or rotated about to generate the data acquired in step 100. Thus, alignment of the emission data and transmission data facilitates accurate attenuation correction by ensuring that emission and transmission data may correspond to the same indicated locations, such as a portion of a patient's anterior chest, heart, etc.

The translation of the acquired data may be achieved through various methods, including shifting, rotating, or modifying pixels within the acquired data to produce a desired result. Further, various conventional translation methods may be employed to modify the acquired data by aligning the emission data and the transmission data.

In various embodiments, the emission data and transmission data may be displayed to a medical professional utilizing the computer 10 to enable the medical professional to move the display emission and transmission data relative to each other until the desired alignment is achieved. Such a configuration ensures that the acquired data is properly aligned before performing additional operations utilizing misregistered data.

The alignment of the emission and transmission data is preferably accomplished in combination with the forward projection of step 108 to facilitate comparison of the transmission and emission data. However, the alignment the acquired data may be matched at any time and need not be limited to aligning forward projections of acquired data.

Additionally, a quality indicator may be provided by the present invention to allow the computer 10 and/or the medical professional to determine if the alignment of the acquired data was successful. Specifically, the quality indicator may be formed by the computer 10 by determining the amount of cardiac data, such as a cardiac transmission counts, positioned within an area corresponding to a patient's lungs. Similarly, the quality indicator may be formed by the computer 10 by otherwise identifying the existence of data outside its anticipated location.

Preferably, the histogram generated in step 104 is utilized to determine the quality of the acquired data and/or if the alignment was successful. Specifically, the histogram generated in step 104 relating to the transmission data may be compared to a histogram related to the emission data to identify pixels within lung fields that have an activity greater than 30% of the myocardial value. However, a new histogram may be created to correspond to the forward projected data and the new histogram may be compared to the emission data. Identified pixels are labeled as misregistered and the total number of misregistered pixels is computed. If a significant fraction of the pixels are misregistered, more than 1% for example, the acquired data is not considered registered and is preferably required or realigned.

For example, if utilization of the histograms indicates that the acquired data is not registered, the transmission and emission data may be automatically realigned to reduce the number of misregistered pixels. Thus, by automatically realigning the transmission data and the emission data, the forward projected transmission data may be registered or otherwise indicated as being of sufficient quality.

The quality indicator is preferably presented by the computer 10 as a visual display or a physical printout. The quality indicator may indicate high quality, acceptable quality, low quality, and other degrees or levels of quality. For example, if 99% of data within a lung field corresponds to a patient's lungs, the quality indicator could indicate high quality or registered. However, as will appreciated by those skilled in the art, innumerable percentages and amounts may be utilized to determine the quality of the alignment, such that the quality indicator may comprise any indication of data identified outside its anticipated location.

In step 110, an ordered subset expectation maximization-bayesian (OSEM-B) algorithm is utilized to reconstruct the acquired transmission data.

In various embodiments, the OSEM-B algorithm may be expressed as:

$$\mu_j^{new} = (1-\alpha_j)\frac{\mu_j^{old}}{\sum\limits_{i \leftarrow S_i} l_{ij}} \sum\limits_{i \leftarrow S_i} l_{ij} \frac{t_i}{\sum\limits_{k} l_{ik}\mu_k^{old}} + \alpha_j \mu_{H_2O}, \text{ and}$$

$$\alpha_j = \alpha_0 \exp\left[-(\mu_j^{old} - \mu_{H_2O})^2/\beta^2\right],$$

wherein i is an index for a line of response, j is an index for a plurality of image pixels, $\mu_j$ is a linear attenuation coefficient at each pixel, $\mu_{h2O}$ is a linear attenuation coefficient for water at 511 keV, $l_{ij}$ is a matrix giving an attenuation length for each pixel corresponding to the line of response, $t_i$ is the acquired transmission data, $\alpha_j$ is a prior strength in the form of a Gaussian distribution with a full width at half maximum $\beta$, $\alpha_0$ is peak prior strength, and $S_i$ is a data subset.

The applied OSEM-B algorithm employs a prior function that preferentially weights the current attenuation coefficient estimate at each pixel toward a soft-tissue region value. The application of the OSEM-B algorithm is spatially varying and non-linearly dependent on previous iteration values. Lung, air, and bone regions are minimally weighted to enable a data-driven solution. Preferably, the OSEM-B algorithm is optimized for the soft-tissue (water) narrow-beam linear attenuation coefficient at 511 keV (0.097 cm$^{-1}$) and/or any other appropriate energies for PET and SPECT applications. Such a configuration improves attenuation correction accuracy.

Figure 8:
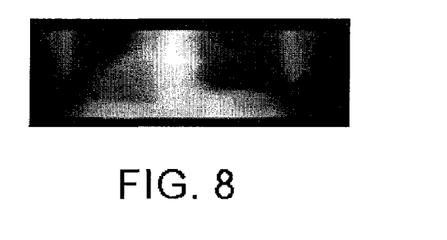
FIG. 8 is an exemplary forward projection of the image of FIG. 7.
Figure 9:
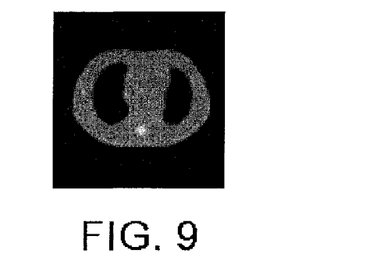
FIG. 9 is an exemplary image corresponding to an OSEM-B reconstruction of the image of FIG. 8.
Figure 10:
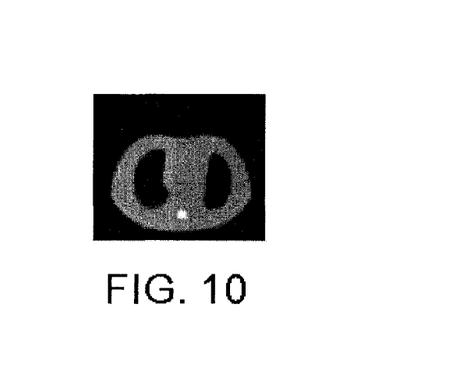
FIG. 10 is an exemplary image corresponding to a traditional Ge-68 transmission map.

FIG. 9 demonstrates an exemplary OSEM-B reconstruction of the transmission sinogram of FIG. 8 while FIG. 10 demonstrates a typical Ge-68 transmission map. As can be seen, the OSEM-B reconstruction generally conforms to the typical Ge-68 transmission map, thereby facilitating attenuation correction by the present invention.

Those skilled in the art will appreciate that variations of the above-expression may be utilized to implement the utilized OSEM-B algorithm. Thus, the OSEM-B algorithm of the present invention may comprise any combination of algorithms utilizing ordered subset expectation maximization (OSEM) and bayesian components.

In step 112, the reconstructed data is forward projected to facilitate attenuation construction. Specifically, the reconstructed data is forward projected to create a transmission sinogram to be utilized for attenuation correction. The transmission sinogram may be conventionally applied to the emission data to correct attenuation such that a corrected PET or other image may be created from reconstruction of the emission data after application of the transmission sinogram. The reconstructed data may be forward projected in a substantially similar method to the forward projection of step 108, such as by utilizing conventional ray tracing forward projection algorithms.

Figure 11:
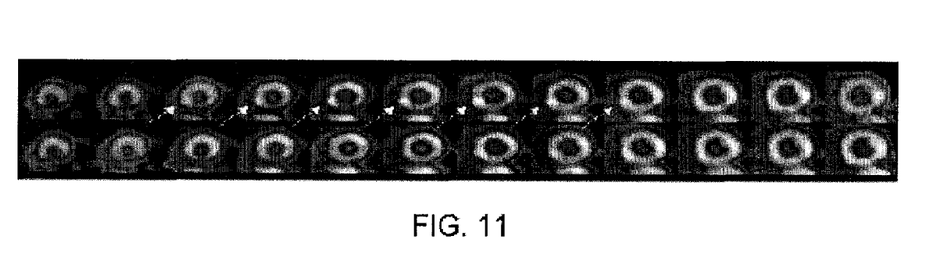
FIG. 11 is an exemplary image corresponding to PET images resulting from application and non-application of the methods of the present invention.

FIG. 11 illustrates various PET images resulting from application and non-application of the methods of the present invention. Particularly, the upper row of FIG. 11 demonstrates various PET images lacking the artifact correction, blurring, and OSEM-B reconstruction of the present invention, while the lower column demonstrates various PET images having the artifact correction, blurring, and OSEM-B reconstruction of the present invention. As is readily apparent, the blurring, resolution matching, alignment, artifact correction, and the OSEM-B reconstruction provides a substantially improved image.

As should be appreciated, the above steps may be performed in any order. For instance, in some embodiments it may be desirable acquire data as discussed in step 100, segment the acquired data as discussed in step 104, replace at least one attenuation coefficient within the acquired data as discussed in step 106, apply a blurring algorithm to the segmented data to correct for motion, as discussed in step 102, forward project the blurred and segmented data to match the resolution of the PET emission and forward projected data in a similar manner to that disclosed in step 108, utilize an OSEM-B algorithm to reconstruct the resolution-matched data in a similar manner to that disclosed in step 110, and forward project the OSEM-B reconstructed data, in a similar manner to that disclosed in step 112. Thus, the above-steps may be performed in any order to achieve any desired result.

Further, in some embodiments, the type of hybrid CT device employed to generate data may affect which steps are preferably performed. For PET/CT configurations, all steps are preferably performed. For dedicated PET configurations, only steps 100, 102, 110, and 112 are preferably performed. However, as should be appreciated, any combination of the steps may be performed to achieve any desired result.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method for hybrid CT attenuation correction, the method comprising the steps of:
   acquiring data from a scanner;
   utilizing an ordered subset expectation maximization-bayesian algorithm to reconstruct the acquired data; and
   forward projecting the reconstructed data.

2. The method of claim 1, wherein the ordered subset expectation maximization-bayesian algorithm is expressed as $$\mu_j^{new} = (1-\alpha_j)\frac{\mu_j^{old}}{\sum\limits_{i \leftarrow S_i} l_{ij}} \sum\limits_{i \leftarrow S_i} l_{ij} \frac{t_i}{\sum\limits_{k} l_{ik}\mu_k^{old}} + \alpha_j \mu_{H_2O}, \text{ and}$$

$$\alpha_j = \alpha_0 \exp\left[-(\mu_j^{old} - \mu_{H_2O})^2/\beta^2\right],$$

wherein i is an index for a line of response, j is an index for a plurality of image pixels, $\mu_j$ is a linear attenuation coefficient at each pixel, $\mu_{h2O}$ is a linear attenuation coefficient for water at 511 keV, $l_{ij}$ is a matrix giving an attenuation length for each pixel corresponding to the line of response, $t_i$ is the acquired transmission data, $\alpha_j$ is a prior strength in the form of a Gaussian distribution with a full width at half maximum $\beta$, $\alpha_0$ is peak prior strength, and $S_i$ is a data subset.

3. The method of claim 1, wherein the scanner is a PET/CT imaging device.

4. The method of claim 1, wherein the acquired data corresponds to PET and CT image data and the method further includes matching the resolution of the PET and CT image data.

5. The method of claim 1, wherein the scanner is a dedicated PET imaging device.

6. The method of claim 1, further including applying a Gaussian blur to the acquired data to correct for diaphragm motion.

7. The method of claim 1, further including segmenting the acquired data and replacing at least one attenuation coefficient within the segmented data to at least partially remove a transmission artifact.

8. The method of claim 7, wherein the replaced attenuation coefficients are replaced with attenuation coefficients selected from the group consisting of water coefficients, metal coefficients, and soft tissue coefficients.

9. The method of claim 1, wherein the reconstructed data is forward projected to create a transmission sinogram to facilitate attenuation correction.

10. A method of PET/CT attenuation correction, the method comprising the steps of:
acquiring data corresponding to PET emission and CT transmission images generated by a PET/CT scanner;
applying a blurring algorithm to at least a portion of the acquired data to correct for diaphragm motion;
segmenting at least a portion of the acquired data;
replacing at least one attenuation coefficient within the segmented data to at least partially remove a transmission artifact;
forward projecting the segmented data to match the resolution of the PET emission and forward projected data;
utilizing an ordered subset expectation maximization-bayesian algorithm to reconstruct the forward projected data; and
forward projecting the reconstructed data.

11. The method of claim 10, wherein the ordered subset expectation maximization-bayesian algorithm is expressed as $$\mu_j^{new} = (1-\alpha_j)\frac{\mu_j^{old}}{\sum_{i \leftarrow S_i} l_{ij}} \sum_{i \leftarrow S_i} l_{ij} \frac{t_i}{\sum_k l_{ik}\mu_k^{old}} + \alpha_j\mu_{H_2O}, \text{ and}$$

$$\alpha_j = \alpha_0\exp\left[-(\mu_j^{old}-\mu_{H_2O})^2/\beta^2\right],$$

wherein i is an index for a line of response, j is an index for a plurality of image pixels, $\mu_j$ is a linear attenuation coefficient at each pixel, $\mu_{h20}$ is a linear attenuation coefficient for water at 511 keV, $l_{ij}$ is a matrix giving an attenuation length for each pixel corresponding to the line of response, $t_i$ is the acquired transmission data, $\alpha_j$ is a prior strength in the form of a Gaussian distribution with a full width at half maximum $\beta$, $\alpha_0$ is peak prior strength, and $S_i$ is a data subset.

12. The method of claim 10, wherein the replaced attenuation coefficients are replaced with attenuation coefficients selected from the group consisting of water coefficients, metal coefficients, and soft tissue coefficients.

13. The method of claim 10, wherein the reconstructed data is forward projected to create a transmission sinogram to facilitate PET attenuation correction.

14. The method of claim 10, further including aligning the PET and CT image data to prevent misregistration between the PET and CT image data.

15. The method of claim 10, wherein the blurring algorithm is a Gaussian blurring algorithm.

16. A computer program for performing hybrid CT attenuation correction, at least a portion of the computer program stored on a computer-readable medium for operating a computing element and comprising:
a code segment operable to be executed by the computing element to acquire data from a scanner;
a code segment operable to be executed by the computing element to reconstruct the acquired data utilizing an ordered subset expectation maximization-bayesian algorithm; and
a code segment operable to be executed by the computing element to forward project the reconstructed data.

17. The computer program of claim 16, wherein the ordered subset expectation maximization-bayesian algorithm is expressed as $$\mu_j^{new} = (1-\alpha_j)\frac{\mu_j^{old}}{\sum_{i \leftarrow S_i} l_{ij}} \sum_{i \leftarrow S_i} l_{ij} \frac{t_i}{\sum_k l_{ik}\mu_k^{old}} + \alpha_j\mu_{H_2O}, \text{ and}$$

$$\alpha_j = \alpha_0\exp\left[-(\mu_j^{old}-\mu_{H_2O})^2/\beta^2\right],$$

wherein i is an index for a line of response, j is an index for a plurality of image pixels, $\mu_j$ is a linear attenuation coefficient at each pixel, $\mu_{h20}$ is a linear attenuation coefficient for water at 511 keV, $l_{ij}$ is a matrix giving an attenuation length for each pixel corresponding to the line of response, $t_i$ is the acquired transmission data, $\alpha_j$ is a prior strength in the form of a Gaussian distribution with a full width at half maximum $\beta$, $\alpha_0$ is peak prior strength, and $S_i$ is a data subset.

18. The computer program of claim 16, further including a code segment operable to be executed by the computing element to correct for diaphragm motion by applying a Gaussian blur to the acquired data.

19. The computer program of claim 16, further including a code segment operable to be executed by the computing element to at least partially remove a transmission artifact by segmenting the acquired data and replacing at least one attenuation coefficient within the segmented data.

20. The computer program of claim 19, wherein the replaced attenuation coefficients are replaced with attenuation coefficients selected from the group consisting of water coefficients, metal coefficients, and soft tissue coefficients.

21. A system operable to perform hybrid CT attenuation correction, the system comprising:
a computing element coupled with a scanner, the computing element operable to acquire data from the scanner,
utilize an ordered subset expectation maximization-bayesian algorithm to reconstruct the acquired data, and
forward project the reconstructed data.

22. The system of claim 21, wherein the computing element and the scanner are integral.

23. The system of claim 21, wherein the ordered subset expectation maximization-bayesian algorithm is expressed as $$\mu_j^{new} = (1-\alpha_j)\frac{\mu_j^{old}}{\sum_{i \leftarrow S_i} l_{ij}} \sum_{i \leftarrow S_i} l_{ij} \frac{t_i}{\sum_k l_{ik}\mu_k^{old}} + \alpha_j\mu_{H_2O}, \text{ and}$$

$$\alpha_j = \alpha_0\exp\left[-(\mu_j^{old}-\mu_{H_2O})^2/\beta^2\right],$$

wherein i is an index for a line of response, j is an index for a plurality of image pixels, $\mu_j$ is a linear attenuation coefficient at each pixel, $\mu_{h20}$ is a linear attenuation coefficient for water at 511 keV, $l_{ij}$ is a matrix giving an attenuation length for each pixel corresponding to the line of response, $t_i$ is the acquired transmission data, $\alpha_j$ is a prior strength in the form of a Gaussian distribution with a full width at half maximum $\beta$, $\alpha_0$ is peak prior strength, and $S_i$ is a data subset.

24. The system of claim 21, wherein the computing element is further operable to apply a Gaussian blur to the acquired data to correct for patient motion.

25. The system of claim 21, wherein the computing element is further operable to segment the acquired data and replace at least one attenuation coefficient within the segmented data to at least partially remove a transmission artifact.

26. The system of claim 25, wherein the replaced attenuation coefficients are replaced with attenuation coefficients selected from the group consisting of water coefficients, metal coefficients, and soft tissue coefficients.

* * * * *